United States Patent
Desai et al.

US006531541B1

(10) Patent No.: US 6,531,541 B1
(45) Date of Patent: Mar. 11, 2003

(54) COATING COMPOSITIONS, COATED SUBSTRATES AND METHODS FOR INHIBITING SOUND TRANSMISSION THROUGH A SUBSTRATE

(75) Inventors: Umesh C. Desai, Wexford, PA (US); Charles M. Kania, Natrona Heights, PA (US); Anthony C. Palermo, Gibsonia, PA (US); Kaliappa G. Ragunathan, Pittsburgh, PA (US); Shanti Swarup, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/574,426

(22) Filed: May 19, 2000

(51) Int. Cl.$^7$ .............................................. C08C 31/00
(52) U.S. Cl. ...................................................... 524/832
(58) Field of Search ........................................ 524/832

(56) References Cited

U.S. PATENT DOCUMENTS

| | | | |
|---|---|---|---|
| 2,871,223 A | | 1/1959 | Hankins et al. ................ 260/70 |
| 3,926,880 A | * | 12/1975 | Esser .......................... 260/29.7 |
| 3,988,281 A | * | 10/1976 | Minami ........................ 260/29.6 |
| 4,151,142 A | | 4/1979 | Herman et al. .............. 260/29.6 |
| 4,258,104 A | * | 3/1981 | Lee .............................. 428/342 |
| 4,350,782 A | | 9/1982 | Kuchler et al. ................ 523/35 |
| 4,533,254 A | | 8/1985 | Cook et al. ................... 366/176 |
| 4,627,689 A | | 12/1986 | Asher .......................... 350/362 |
| 4,739,019 A | | 4/1988 | Schappert et al. ............ 525/438 |
| 4,740,546 A | * | 4/1988 | Masuda ........................ 524/315 |
| 4,803,252 A | * | 2/1989 | Kida ............................ 526/297 |
| 4,812,484 A | * | 3/1989 | Endo ............................. 521/60 |
| 5,004,764 A | | 4/1991 | Yamamoto et al. ........... 523/400 |
| 5,021,469 A | | 6/1991 | Langerbeins et al. ........ 523/201 |
| 5,066,715 A | * | 11/1991 | Angel ........................... 524/812 |
| 5,071,904 A | | 12/1991 | Martin et al. ................. 524/458 |
| 5,098,947 A | | 3/1992 | Metzger et al. .............. 524/507 |
| 5,135,297 A | * | 8/1992 | Valint .......................... 351/160 |
| 5,139,882 A | | 8/1992 | Elser et al. ................... 428/522 |
| 5,162,060 A | | 11/1992 | Bredow et al. .............. 106/808 |
| 5,162,415 A | | 11/1992 | Rehmer et al. .............. 524/359 |
| 5,210,199 A | | 5/1993 | Grosius et al. ............. 548/324.1 |
| 5,350,795 A | * | 9/1994 | Smith ........................... 524/507 |
| 5,356,956 A | | 10/1994 | Uemae et al. ................ 523/401 |
| 5,360,839 A | * | 11/1994 | Tanimoto ..................... 523/414 |
| 5,405,879 A | | 4/1995 | Uemae et al. ................ 523/201 |
| 5,432,229 A | * | 7/1995 | Aoki ............................ 524/820 |
| 5,498,723 A | | 3/1996 | Riondel et al. ............. 548/324.1 |
| 5,578,650 A | | 11/1996 | Delgado et al. ............... 521/56 |
| 5,610,313 A | | 3/1997 | Riondel et al. ............. 548/324.1 |
| 5,618,859 A | | 4/1997 | Maeyama et al. ............ 523/201 |
| 5,637,689 A | | 6/1997 | Herbst et al. ................ 540/460 |
| 5,700,862 A | * | 12/1997 | Sho ............................. 524/403 |
| 5,719,247 A | | 2/1998 | Delgado et al. ............. 526/323.2 |
| 5,725,789 A | * | 3/1998 | Huber .......................... 252/8.62 |
| 5,741,824 A | | 4/1998 | Butschbacher et al. ........ 521/73 |
| 5,744,613 A | | 4/1998 | Riondel et al. ............. 548/324.1 |
| 5,813,452 A | * | 9/1998 | Haruta ......................... 165/133 |
| 5,858,025 A | * | 1/1999 | Batty ............................. 8/445 |
| 5,883,261 A | | 3/1999 | Esch et al. ................. 548/324.1 |
| 5,908,908 A | | 6/1999 | Vanhoye et al. ............ 526/318.4 |
| 6,025,449 A | * | 2/2000 | Enomoto ..................... 526/320 |
| 6,133,345 A | * | 10/2000 | Pakusch ...................... 523/342 |
| 6,203,720 B1 | * | 3/2001 | Thames .................. 252/182.12 |
| 6,270,905 B1 | * | 8/2001 | Swarup ....................... 428/463 |

FOREIGN PATENT DOCUMENTS

| | | |
|---|---|---|
| CA | 2011521 | 9/1990 |
| CA | 2128753 | 7/1995 |
| FR | 2343575 | 9/1993 |
| JP | 04202262 | 7/1992 |
| JP | 93050985 | 7/1993 |
| JP | 55058262 | 9/1993 |
| JP | 57055970 | 9/1993 |
| JP | 58217550 | 9/1993 |
| JP | 63116847 | 9/1993 |
| JP | 04306273 | 10/1993 |
| JP | 5285970 | 1/1994 |
| JP | 6073184 | 3/1994 |
| JP | 7-3188 | 1/1995 |
| JP | 07-62291 | 5/1995 |
| JP | 07110775 | 11/1995 |
| JP | 07292318 | 1/1996 |
| JP | 08041381 | 4/1996 |
| JP | 2520423 | 7/1996 |
| JP | 04161401 | 1/1997 |
| JP | 9040812 | 2/1997 |
| JP | 09111132 | 7/1997 |
| JP | 10-60311 | 3/1998 |
| JP | 09151335 | 5/1998 |
| JP | 10183017 | 9/1998 |
| JP | 10-324822 | 12/1998 |
| JP | 11-29737 | 2/1999 |
| WO | WO93/12147 | 6/1993 |
| WO | WO98/51743 | 11/1998 |
| WO | WO99/35197 | 7/1999 |

OTHER PUBLICATIONS

*Hawley's Condensed Chemical Dictionary*, 12th Ed. 1993, p. 435.
*Encyclopedia of Chemical Technology*, 1963, vol. 1, p. 305.
*Development of a Ureido Functional Monomer for Promoting Wet Adhesion in Latex Paints*, by Ronald W. Kreis et al., Presented at the Water–Borne & High Solids Coatings Symposium, Feb. 3–5, 1988, pp. 222–243.
"Wet Adhesion Promoters for Paints: NORSOCRYL 100 Series", Product Bulletin from Elf Atochem.
39/ Interference and Diffraction, pp. 938–939.
ACRONAL DS 3502 Product Bulletin.
English translation of claims 1–4 in JP 9–40812.
Disclosure Document #66712, Sep. 1993.

* cited by examiner

Primary Examiner—Edward J. Cain
(74) Attorney, Agent, or Firm—Jacques B. Miles; Deborah M. Altman

(57) ABSTRACT

The present invention provides coating compositions including aqueous dispersions of polymeric microparticles prepared from nitrile, carbamate and amide functional materials, polyoxyalkylene acrylates and/or hydroxy functional materials, which are useful for sound deadening applications.

37 Claims, No Drawings

COATING COMPOSITIONS, COATED SUBSTRATES AND METHODS FOR INHIBITING SOUND TRANSMISSION THROUGH A SUBSTRATE

CROSS-REFERENCE TO RELATED APPLICATION

This patent application is related to U.S. Provisional Patent Application Serial No. 60/205,680 entitled "Substrates Having a Coating of a Geometrically Ordered Array of Polymeric Microparticles", filed concurrently with the present application.

FIELD OF THE INVENTION

The present invention relates to coating compositions suitable for sound and vibration dampening.

BACKGROUND OF THE INVENTION

Typically, precut asphalt- or rubber-based patches are used for lining floor pans, deck lids and doors of automobiles to dampen or reduce road and engine noise and vibrations, preventing them from permeating into the passenger compartment of the motor vehicle. Sprayable coatings which are capable of being applied by robotics are desirable to provide labor and cost savings, reduced part inventories and flexibility in design specifications for damping properties. Waterborne or high solids coatings are desirable in trim shop applications where only air dry cure is feasible. It is important that these coatings dry quickly, in about 2 to 3 hours after application, so that the coating does not transfer to other parts of the automobile during assembly operations.

Generally, any coating that contains a volatile component such as water must undergo a decrease in volume as the volatile component evaporates from the surface of the coating. As the volatile component leaves the coating, contraction forces act to pull the coating inward in all directions. However, without intending to be bound by any theory, it is believed that if the coating has sufficient cohesive strength, the coating will contract in only one dimension, that is, the coating thickness will decrease while the coating resists contraction in any direction parallel to the substrate surface. By contrast, if a coating lacks cohesive strength sufficient to resist contraction parallel to the substrate surface, contraction forces will cause the coating to break up into small flat segments that are separated by continuous linear voids. This surface defect is commonly referred to as "mudcracking".

The automotive industry would derive a significant economic benefit from a coating composition which can be spray applied to form a coating which dries quickly, is essentially free of mudcracking and which provides sound and vibration dampening.

SUMMARY OF THE INVENTION

A coating composition according to the present invention is provided which comprises: (a) an aqueous dispersion of polymeric microparticles prepared from components comprising: (i) a nitrile functional material; and (ii) a polyoxyalkylene acrylate; and (b) a filler material.

Another aspect of the present invention is a coating composition comprising: (a) an aqueous dispersion of polymeric microparticles prepared from components comprising: (i) an amide functional material; and (ii) a polyoxyalkylene acrylate; and (b) a filler material.

Another aspect of the present invention is a coating composition comprising: (a) an aqueous dispersion of polymeric microparticles prepared from components comprising: (i) a carbamate functional material; and (ii) a polyoxyalkylene acrylate; and (b) a filler material.

Another aspect of the present invention is a coating composition comprising: (a) an aqueous dispersion of polymeric microparticles having a glass transition temperature greater than 5° C. and being prepared from components comprising: (i) a nitrile functional material; and (ii) a hydroxy functional material; and (b) a filler material.

Another aspect of the present invention is a coating composition comprising: (a) a first aqueous dispersion of polymeric microparticles having a glass transition temperature greater than 5° C. and being prepared from a first nitrile functional material; (b) a second aqueous dispersion of polymeric microparticles having a glass transition temperature greater than 5° C. and being prepared from a second nitrile functional material, the polymeric microparticles of the first aqueous dispersion being different from the polymeric microparticles of the second aqueous dispersion; and (c) a filler material.

Yet another aspect of the present invention is a coating composition comprising: (a) a first aqueous dispersion of polymeric microparticles having a glass transition temperature greater than 5° C. and being prepared from a nitrile functional material; (b) a second aqueous dispersion of polymeric microparticles having a glass transition temperature greater than 5° C. and being prepared from a hydroxy functional material; and (c) a filler material.

Another aspect of the present invention is a coating composition comprising: (a) an aqueous dispersion of polymeric acrylic microparticles having a glass transition temperature greater than +10° C. and being prepared from components comprising: (i) a hydroxy functional material; (ii) an acid functional material; and (iii) an acrylate monomer; and (b) a filler material.

Still another aspect of the present invention is a coated substrate having a coating deposited upon a surface of the substrate comprising: (a) an at least partially dried residue of an aqueous dispersion of polymeric microparticles prepared from components comprising: (i) a nitrile functional material; and (ii) a polyoxyalkylene acrylate; and (b) a filler material.

Yet another aspect of the present invention is a coated substrate having a coating deposited upon a surface of the substrate comprising: (a) an at least partially dried residue of an aqueous dispersion of polymeric microparticles prepared from components comprising: (i) an amide functional material; and (ii) a polyoxyalkylene acrylate; and (b) a filler material.

Another aspect of the present invention is a coated substrate having a coating deposited upon a surface of the substrate comprising: (a) an at least partially dried residue of: (i) a first aqueous dispersion of polymeric microparticles prepared from a first nitrile functional material; and (ii) a second aqueous dispersion of polymeric microparticles prepared from a second nitrile functional material, the polymeric microparticles of the first aqueous dispersion being different from the polymeric microparticles of the second aqueous dispersion; and (b) a filler material.

Yet another aspect of the present invention is a coated substrate having a coating deposited upon a surface of the substrate comprising: (a) an at least partially dried residue of an aqueous dispersion of polymeric microparticles prepared from components comprising: (i) a nitrile functional material; and (ii) a hydroxy functional material; and (b) a filler material.

Another aspect of the present invention is a method for inhibiting sound transmission through a substrate, comprising: (a) applying to the substrate a coating composition comprising: (i) an aqueous dispersion of polymeric microparticles prepared from components comprising a nitrile functional material and a polyoxyalkylene acrylate; and (ii) a filler material; and (b) at least partially drying the coating composition to provide a coating upon the substrate for inhibiting sound transmission therethrough.

Yet another aspect of the present invention is a method for inhibiting sound transmission through a substrate, comprising: (a) applying to the substrate a coating composition comprising: (i) a first aqueous dispersion of polymeric microparticles prepared from a first nitrile functional material; (ii) a second aqueous dispersion of polymeric microparticles prepared from a second nitrile functional material, the polymeric microparticles of the first aqueous dispersion being different from the polymeric microparticles of the second aqueous dispersion; and (iii) a filler material; and (b) at least partially drying the coating composition to provide a coating upon the substrate for inhibiting sound transmission therethrough.

As used herein, unless otherwise expressly specified, all of the numerical ranges, amounts, values and percentages such as those for amounts of materials, times and temperatures of reaction, ratios of amounts, values for molecular weight (whether number average molecular weight ("$M_n$") to or weight average molecular weight ("$M_w$")), and others in the following portion of the specification may be read as if prefaced by the word "about" even though the term "about" may not expressly appear with the value, amount or range. Also, as used herein, the term "polymer" is meant to refer to oligomers and both homopolymers and copolymers.

Also for molecular weights, whether $M_n$ or $M_w$, these quantities are determined by gel permeation chromatography using polystyrene as standards as is well known to those skilled in the art and such as is discussed in U.S. Pat. No. 4,739,019 at column 4, lines 2–45, which incorporated herein by reference in its entirety.

Glass transition temperature ($T_g$) (° C.) is determined using a Differential Scanning Calorimeter (DSC), for example a Perkin Elmer Series 7 Differential Scanning Calorimeter, using a temperature range of about −55° C. to about 150° C. and a scanning rate of about 20° C. per minute.

DETAILED DESCRIPTION OF THE PREFERRED EMBODIMENTS

The present invention provides a coating composition comprising one or more aqueous dispersions of polymeric microparticles. As used herein, the term "dispersion" means that the microparticles are capable of being distributed throughout water as finely divided particles, such as a latex. See *Hawley's Condensed Chemical Dictionary*, (12th Ed. 1993) at page 435, which is hereby incorporated by reference. The uniformity of the dispersion can be increased by the addition of wetting, dispersing or emulsifying agents (surfactants), which are discussed below.

Preferably the polymeric microparticles are thermoplastic, although the polymeric microparticles can include functionality which would permit crosslinking with suitable crosslinking agents such as aminoplasts and polyisocyanates. The polymeric microparticles are essentially hydrophobic but have some hydrophilic character to enable dispersion in water.

The polymeric microparticles are prepared from components comprising one or more nitrile materials, such as acrylonitrile, methacrylonitrile, macromonomers, copolymers, esters thereof, nitrile rubbers and mixtures thereof. Useful nitrile materials also include polymers including both vinyl and nitrile groups. Transesterification products of cyanoacetic acid with hydroxyl functional materials are also useful. The nitrile functional material generally comprises about 1 to about 95 weight percent of the components used to prepare the polymeric microparticles on a basis of total weight of the components used to prepare the polymeric microparticles, and preferably about 15 to about 40 weight percent.

In an alternative embodiment, in lieu of or in addition to the nitrile materials discussed above, the polymeric microparticles are prepared from components comprising one or more amide functional materials, such as acrylamides, methacrylamides or n-butoxy methacrylamide and polymers and copolymers thereof present in similar amounts to the nitrile materials discussed above. The amide functional material generally comprises about 1 to about 95 weight percent of the components used to prepare the polymeric microparticles on a basis of total weight of the components used to prepare the polymeric microparticles, and preferably about 15 to about 40 weight percent.

In another alternative embodiment, in lieu of or in addition to the nitrile materials and/or amide functional polymers discussed above, carbamate functional materials can be included in the polymeric microparticles, for example by copolymerizing the nitrile materials and/or amide functional polymers or ethylenically unsaturated monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Other useful carbamate functional monomers are disclosed in U.S. Pat. No. 5,098,947, which is incorporated herein by reference. The carbamate functional material generally comprises about 1 to about 95 weight percent of the components used to prepare the polymeric microparticles on a basis of total weight of the components used to prepare the polymeric microparticles, and preferably about 15 to about 40 weight percent.

In a preferred embodiment, the components used to prepare the polymeric microparticles further comprise one or more polyoxyalkylene acrylates which can reduce mudcracking in the coating composition. Generally, the polyoxyalkylene acrylate comprises a backbone of repeating alkylene glycol units. The polyoxyalkylene acrylate can be terminated at one end with an acrylate group and at the other end with an alkoxy group containing about 1 to about 6 carbon atoms. The polyoxyalkylene acrylate can further comprise one or more pendant functional groups such as hydroxy, amido, carboxy, carbamate, urea, mercapto or urethane. Preferably, the polyoxyalkylene acrylate has one or more terminal alkoxy groups such as methoxy groups, ethoxy groups, butoxy groups, pentoxy groups and hexoxy groups.

Preferably, the polyoxyalkylene acrylate has a structure (including isomers thereof) as shown in Formula (I) below:

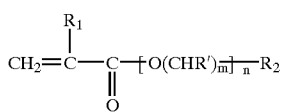

$$CH_2=C{\overset{R_1}{\underset{\overset{\|}{O}}{|}}}C{-}[O(CHR')_m]_n{-}R_2 \qquad (I)$$

wherein $R_1$ is H or $CH_3$; $R_2$ is a terminal alkoxy group containing about 1 to about 6 carbon atoms, such as methoxy (preferred), ethoxy, butoxy, pentoxy and hexoxy; R' is independently selected from H or $CH_3$; m is an integer which can range from about 2 to about 4; and n is an integer which can range from about 2 to about 200, preferably ranges from about 3 to about 40 and more preferably ranges from about 4 to about 20.

Non-limiting examples of suitable polyoxyalkylene acrylates include alkoxy polyoxyethylene acrylates, alkoxy polyoxyethylene methacrylates, alkoxy polyoxypropylene acrylates, alkoxy polyoxypropylene methacrylates, alkoxy polyoxyethyleneoxypropylene acrylates, alkoxy polyoxyethyleneoxypropylene methacrylates, alkoxy polyoxybutylene acrylates, alkoxy polyoxybutylene methacrylates, copolymers and mixtures thereof. Preferably, the polyoxyalkylene acrylate is methoxy polyoxyethylene methacrylate (also known as methoxy polyethylene glycol methacrylate). A preferred methoxy polyethylene glycol methacrylate is MA-550 which is commercially available from La Porte Chemicals, Houston, Tex.

The polyoxyalkylene acrylate can comprise about 1 to about 99 weight percent of the components used to produce the polymeric microparticles based upon the total weight of components used to produce the polymeric microparticles, preferably about 1 to about 20 weight percent, and more preferably about 3 to about 7 weight percent.

The components used to prepare the polymeric microparticles can further comprise one or more copolymerizable ethylenically unsaturated monomers which are chemically different from the polyoxyalkylene acrylates and nitrile functional materials, i.e., have at least one element or amount of an element which is different from the polyoxyalkylene acrylates and nitrile functional materials, amide functional polymers and carbamate functional materials. The polymeric microparticles can be self-crosslinking, for example by forming the polymeric microparticles from acrylic monomers capable of internally crosslinking such as n-alkoxyacrylamide, or crosslinked by reaction with suitable crosslinking materials included in the film-forming composition. The polymeric microparticles can be cationic, anionic or nonionic, but are preferably anionic.

Non-limiting examples of useful ethylenically unsaturated carboxylic acid monomers include acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. Preferred ethylenically unsaturated carboxylic acid monomers are acrylic acid and methacrylic acid.

Non-limiting examples of other useful ethylenically unsaturated vinyl monomers include alkyl esters of acrylic and methacrylic acids, such as methyl acrylate, ethyl acrylate, methyl methacrylate, ethyl methacrylate, butyl acrylate, butyl methacrylate, 2-ethylhexyl acrylate, 2-ethylhexyl methacrylate, 2-hydroxyethyl acrylate, 2-hydroxyethyl methacrylate, hydroxypropyl methacrylate, ethylene glycol dimethacrylate, isobornyl methacrylate and lauryl methacrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

Generally, the ethylenically unsaturated monomer(s) comprise about 1 to about 85 percent by weight of the components used to produce the polymeric microparticles based upon the total weight of components used to produce the polymeric microparticles, preferably about 40 to about 80 weight percent, and more preferably about 50 to about 70 weight percent.

The polymeric microparticles can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, preferably having 2 to 6 carbon atoms in the hydroxy alkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. Including hydroxyl functional materials in the polymer microparticle components can provide fast drying under ambient conditions (about 25° C. and atmospheric pressure).

Urethane functional groups can be included in the polymeric microparticles by copolymerizing the monomers with a urethane functional monomer such as the reaction product of an ethylenically unsaturated isocyanate with an alkanol.

Urea functional groups can be included in the polymeric microparticles by copolymerizing the monomers with a urea functional monomer such as hydroxyethyl ethylene urea (meth)acrylate.

Ureido functional groups can be included in the polymeric microparticles by copolymerizing the monomers with a ureido functional monomer such as ethylimidazolidone (meth)acrylates and ethylimidazolidone (meth)acryamides. Useful ureido functional materials include the NORSOCRYL ureido functional monomers (which also can contain other acrylate monomers) which are commercially available from Elf Atochem.

In a preferred embodiment, the polymeric microparticles have a glass transition temperature greater than 5° C. and are prepared from one or more nitrile functional materials and one or more hydroxy functional materials, such as acrylonitrile and hydroxyethyl methacrylate. The weight ratio of nitrile functional material to hydroxy functional material can range from about 5:95 to about 95:5, and preferably about 10:3 to about 10:4.

In an alternative preferred embodiment, acrylic polymeric microparticles having a glass transition temperature greater than +10° C. (preferably greater than about +20° C.) are prepared from one or more hydroxy functional materials such as hydroxyethyl methacrylate; one or more acid functional materials such as (meth)acrylic acid; and one or more acrylate monomers such as butyl acrylate and methyl methacrylate. These acrylic polymeric microparticles preferably are generally uniform, i.e., not core-shell. In this embodiment, the amount of hydroxy functional materials used to prepare the microparticles can range from about 1 to about 25 weight percent; the amount of acid functional materials can range from about 0.1 to about 10 weight percent; and the amount of acrylate monomers can range from about 65 to about 98.9 weight percent on a basis of total weight of the monomer components used to prepare the polymeric acrylic microparticles.

Other components which are useful in forming the polymeric microparticles include polyesters, surfactants, initiators, chain transfer agents and solvents. Suitable polyesters include hydroxy functional ethylenically unsaturated polyesters. Useful surfactants include sodium lauryl sulfate. Examples of useful chain transfer agents include tertiary alkyl mercaptans, mercaptoethanol, ethanol and isopropanol. Suitable solvents include butyl ether of dipropylene glycol, methyl ether of propylene glycol and xylene.

The components of the polymeric microparticles can be present as a blend, but preferably are the polymerization reaction product of the components. Methods for polymerizing acrylic monomers with themselves and/or other addition polymerizable monomers and preformed polymers are well known to those skilled in the art of polymers and further discussion thereof is not believed to be necessary in view of the present disclosure. For example, polymerization of the acrylic monomer can be carried out in aqueous or organic solvent solution such as xylene, in emulsion, or in aqueous dispersion. See Kirk-Othmer, *Encyclopedia of Chemical Technology*, (1963) Vol. 1 at page 305. Preferably, the acrylic polymer is prepared by emulsion polymerization. The polymerization can be effected by means of a suitable initiator system.

The number average molecular weight ($M_n$) of the polymeric microparticles can range from about 1000 to about 50,000 grams per mole and is preferably about 5000 to about 20,000, as determined by gel permeation chromatography using a polystyrene standard. The glass transition temperature of the polymeric microparticles can range from about −50° C. to about 120° C., preferably about 5° C. to about +50° C., and more preferably about 5° C. to about +35° C.

The acid functional groups can be neutralized using amines such as dimethylethanolamine, ammonia, triethanolamine, dimethylethyl ethanolamine or N',N'-dimethyl aminopropylamine or alkali metal salts such as sodium or potassium hydroxide. Generally, the polymeric microparticles are present in an amount ranging from about 50 to about 100 weight percent on a basis of total resin solids of the coating composition, preferably about 70 to about 95 weight percent, and more preferably about 80 to about 90 weight percent.

In a preferred embodiment, the coating composition comprises a first aqueous dispersion of polymeric microparticles having a glass transition temperature greater than 5° C. (preferably greater than about 10° C.) and being prepared from a first nitrile functional material and a second aqueous dispersion of polymeric microparticles having a glass transition temperature greater than 5° C. (preferably greater than about 10° C.) and being prepared from a second nitrile functional material, the polymeric microparticles of the first aqueous dispersion being different from the polymeric microparticles of the second aqueous dispersion. For example, chemically different nitrile functional materials can be used for the first polymeric microparticles than the second polymeric microparticles and/or other different components can be used for the first polymeric microparticles than the second polymeric microparticles. The weight ratio of the amount of the first aqueous dispersion to the amount of the second aqueous dispersion can range from about 5:95 to about 95:5.

In a preferred embodiment, the polymeric microparticles of the first aqueous dispersion are prepared from at least an acrylonitrile material and polyoxyalkylene acrylate and the polymeric microparticles of the second aqueous dispersion are prepared from at least an acrylonitrile material and a hydroxy functional material. The weight ratio of the amount of the first aqueous dispersion to the amount of the second aqueous dispersion can range from about 5:95 to about 95:5, and preferably about 4:1 to about 5:1. Preferably, the polymeric microparticles are a blend of two different types of polymeric microparticles, one type being prepared by polymerizing acrylonitrile, butyl acrylate, methoxy polyoxyethylene methacrylate, methyl methacrylate and methacrylic acid, the second type being prepared by polymerizing acrylonitrile, butyl acrylate, hydroxyethyl methacrylate, methyl methacrylate and methacrylic acid.

Yet another embodiment of the present invention is a coating composition comprising a blend of a first aqueous dispersion of polymeric microparticles having a glass transition temperature greater than 5° C. and being prepared from a nitrile functional material; and a second aqueous dispersion of polymeric microparticles having a glass transition temperature greater than 5° C. and being prepared from a hydroxy functional material. The weight ratio of the amount of the first aqueous dispersion to the amount of the second aqueous dispersion can range from about 5:95 to about 95:5, and preferably about 4:1 to about 5:1.

In a preferred embodiment, the dispersion of polymeric microparticles in an aqueous medium is prepared by conventional emulsion polymerization techniques which are well known to those skilled in the art. The aqueous microparticle dispersions can be prepared by conventional emulsion batch process or a continuous process. In one example of a batch process, the unreacted microdispersion is fed over a period of about 1 to 4 hours into a heated reactor initially charged with water. The initiator can be fed in simultaneously, it can be part of the microdispersion or it can be charged to the reactor before feeding in the microdispersion. The optimum temperature depends upon the specific initiator being used. The length of time typically ranges from about 2 hours to about 6 hours. The temperature of reaction can range from about 25° C. to about 90° C.

In a preferred embodiment, water and a small portion of the alkyl acrylate monomers are charged to a reactor with a small amount of surfactant and free radical initiator to form a seed. A preemulsion of the remaining monomers, surfactant and water are fed along with the initiator over a prescribed period of time (3 hours) at a reaction temperature of 80–85° C. using a nitrogen blanket. After a one hour hold, upon completion of the monomer feed, a post redox feed to reduce residual free monomer (including hydrogen peroxide/isoascorbic acid) is added to the reactor. The latex product is neutralized to a pH of about 8.

In order to conduct the polymerization of the ethylenically unsaturated monomers, a free radical initiator is usually present. Both water soluble and oil soluble initiators can be used. Since the addition of certain initiators, such as redox initiators, can result in a strong exothermic reaction, it is generally desirable to add the initiator to the other ingredients immediately before the reaction is to be conducted. Examples of water soluble initiators include ammonium peroxydisulfate, potassium peroxydisulfate and hydrogen peroxide. Examples of oil soluble initiators include t-butyl hydroperoxide, dilauryl peroxide, t-butyl perbenzoate and 2,2'-azobis(isobutyronitrile). Preferably redox initiators such as ammonium peroxydisulfate/sodium metabisulfite or t-butylhydroperoxide/isoascorbic acid are utilized herein.

Alternatively, the dispersion of polymeric microparticles in an aqueous medium can be prepared by a high stress technique such as microfluidization by use of a MICROFLUIDIZER® emulsifier which is available from Microfluidics Corporation in Newton, Mass. The MICROFLUIDIZER® high pressure impingement emulsifier is disclosed in U.S. Pat. No. 4,533,254, which is hereby incorporated by reference. The device consists of a high pressure (up to about 1.4×10$^5$ kPa (20,000 psi)) pump and an interaction chamber in which emulsification takes place. The pump forces the mixture of reactants in aqueous medium into the chamber where it is split into at least two streams which pass at very high velocity through at least two slits and collide, resulting in the particulation of the mixture into small particles. Generally, the reaction mixture is passed through the emulsifier once at a pressure of between about 3.5×10$^4$ and about 1×10$^5$ kPa (5,000 and 15,000 psi). Multiple passes can result in smaller average particle size and a narrower range for the particle size distribution. When using the aforesaid MICROFLUIDIZER® emulsifier, stress is applied by liquid-liquid impingement as has been described. However, it should be understood that, if desired, other modes of applying stress to the pre-emulsification mixture can be utilized so long as sufficient stress is applied to achieve the requisite particle size distribution, that is, such that after polymerization less than 20 percent of the polymer microparticles have a mean diameter greater than 5 microns. For example, one alternative manner of applying stress would be the use of ultrasonic energy.

Once the polymerization is complete, the resultant product is a stable dispersion of polymer microparticles in an aqueous medium. The aqueous medium, therefore, is substantially free of water soluble polymer. The resultant polymer microparticles are, of course, insoluble in the aqueous medium. As used herein, "substantially free" means that the aqueous medium contains no more than 30 percent by weight of dissolved polymer, preferably no more than 15 percent. By "stably dispersed" is meant that the polymer microparticles do not settle upon standing and essentially do not coagulate or flocculate during manufacturing or on standing.

Preferably, the particle size of the polymer microparticle dispersion is uniformly small, i.e., after polymerization less than 20 percent of the polymer microparticles have a mean diameter which is greater than 5 microns, more preferably greater than 1 micron. Generally, the microparticles have a mean diameter from about 0.01 microns to about 10 microns. Preferably the mean diameter of the particles after polymerization ranges from about 0.05 microns to about 0.5 microns. The particle size can be measured with a particle size analyzer such as the Coulter N4 instrument commercially available from Coulter. The instrument comes with detailed instructions for making the particle size measurement. However, briefly, a sample of the aqueous dispersion is diluted with water until the sample concentration falls within specified limits required by the instrument. The measurement time is 10 minutes.

Generally, the microparticle dispersions are materials of relatively low viscosity. Dispersions can be prepared directly with a total solids content of from about 20 percent to about 70 percent. The molecular weight of the polymer and viscosity of the claimed aqueous dispersions are independent of each other. The weight average molecular weight can range from a several thousand to greater than 500,000 grams per mole.

The microparticle can be either internally crosslinked or uncrosslinked. When the microparticles are internally crosslinked, they are referred to as a microgel. Monomers used in preparing the microparticle so as to render it internally crosslinked include those ethylenically unsaturated monomers having more than one site of unsaturation, such as ethylene glycol dimethacrylate, allyl methacrylate, hexanediol diacrylate, methacrylic anhydride, tetraethylene glycol diacrylate, tripropylene glycol diacrylate, and the like.

Microparticles can have a core/shell morphology or interpenetrating morphology if suitable hydrophilic ethylenically unsaturated monomer(s) are included in the mixture of monomer(s) used to produce reaction product. Due to its hydrophobic nature, the hydrophobic polymer will tend to be incorporated into the interior, or core, of the microparticle and the hydrophilic monomer(s) will tend to be incorporated into the exterior, or shell, of the microparticles. Suitable hydrophilic monomers include, for example, acrylic acid, methacrylic acid, vinyl acetate, N-methylol acrylamide, hydroxyethyl acrylate, and hydroxypropyl methacrylate. As mentioned in U.S. Pat. No. 5,071,904, it may be desirable to add water soluble monomer(s) after the other components of the dispersion of polymeric microparticles have been particularized into microparticles.

In order to obtain the advantages of a high solids waterborne coating composition, the coating composition should have sufficiently low viscosity to allow adequate atomization of the coating during spray application. The viscosity of the primary coating composition can be controlled partially by choosing components and reaction conditions that control the amount of hydrophilic polymer in the aqueous phase and in the shell of the polymeric microparticles. Interactions among microparticles, and consequently the rheology of coatings containing them, are greatly affected by the ionic charge density on the surface of the microparticles. Charge density can be increased by increasing the amount of acrylic acid polymerized into the shell of a microparticle. The amount of acrylic acid incorporated into the shell of a microparticle can also be increased by increasing the pH of the aqueous medium in which the polymerization takes place.

The coating composition can further comprise one or more polymeric film-forming materials chemically different from the polymeric microparticles discussed above. Useful polymeric film-forming materials include polyepoxides, polyurethanes, polyamides, polyesters, polyacrylates, polyvinyl chlorides and mixtures and copolymers thereof.

Useful polyepoxides have at least two epoxide or oxirane groups per molecule and include epoxy-functional oligomers, polymers and/or copolymers. Generally, the epoxide equivalent weight of the epoxy-functional polymer can range from about 70 to about 4,000, as measured by titration with perchloric acid and quaternary ammonium bromide using methyl violet as an indicator. Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials include polyepoxides comprised of epoxy polyethers obtained by reacting an epihalohydrin (such as epichlorohydrin or epibromohydrin) with a di- or polyhydric alcohol in the presence of an alkali, such as diglycidyl ethers of bisphenol A, for example EPON® 828 epoxy resin which is commercially available from Shell Chemical Company.

Useful thermoplastic polymeric film-forming materials include polyvinyl acetate; aromatic vinyl polymers; vinyl copolymers having vinyl aromatic hydrocarbons as monomer components such as polystyrene, styrene-butadiene copolymers, styrene-divinylbenzene copolymers and styrene-acrylonitrile copolymers; saturated polyesters including saturated aliphatic polyesters such as polyneopentyl adipate, polypropylene adipate and poly epsilon-caprolactone; polyacrylates such as polyalkyl (meth) acrylates having alkyl groups with 1–8 carbon atoms, polymethacrylates or polyalkyl(meth)acrylates obtained by polymerization of methyl methacrylate, isobutyl methacrylate and 2-ethylhexyl acrylate; saturated polyester urethanes;

polybutadienes; polyvinyl chlorides and polyvinyl chloride/ acetates. Useful substantially saturated polyesters are prepared from polyfunctional acids and polyhydric alcohols by methods such as are disclosed in U.S. Pat. No. 4,739,019 at column 3, line 22 through column 5, line 15.

In a preferred embodiment, a polyacrylate film-forming material such as ACRONAL DS 3502 polyacrylate copolymer emulsion prepared from methyl acrylate, butyl acrylate, methyl methacrylate and methacrylic acid is included in the coating composition. See ACRONAL DS 3502 Product Bulletin (November 1998), which is hereby incorporated by reference.

Generally, the film-forming material is present in the coating composition in an amount ranging from about 1 to about 40 percent by weight based on the total resin solids of the composition, preferably about 5 to about 30 percent by weight.

The coating composition further comprises one or more fillers for improving the vibration and sound dampening capabilities of the coating. Useful fillers include mica, powdered slate, montmorillonite flakes, glass flakes, metal flakes, graphite, talc, iron oxide, clay minerals, cellulose fibers, mineral fibers, carbon fibers, glass or polymeric fibers or beads, ferrite, calcium carbonate, calcium, magnesium carbonate, barytes, ground natural or synthetic rubber, silica, aluminum hydroxide, alumina powder and mixtures thereof.

The filler material can comprise about 20 to about 90 weight percent of the coating composition on a basis of total weight of the coating composition, and preferably about 50 to about 80 weight percent.

Additionally, one or more plasticizers can be included in the dispersion phase with these polymers and copolymers. Non-limiting examples of suitable plasticizers include adipates, benzoates, glutarates, isophthalates, phosphates, polyesters, sebacates, sulfonamides and terephthalates. The amount of plasticizer can range from about 0.1 up to about 50 weight percent of the total weight of the coating composition.

The compositions of the present invention can include a variety of optional ingredients and/or additives that are somewhat dependent on the particular application of the composition, such as dyes or pigments such as carbon black or graphite, reinforcements, thixotropes, accelerators, surfactants, extenders, stabilizers, corrosion inhibitors, diluents, blowing agents and antioxidants. Suitable thixotropes include fumed silica, bentonite, stearic acid-coated calcium carbonate, fatty acid/oil derivatives and associative urethane thickeners such as RM-8 which is commercially available from Rohm and Haas. Thixotropes are generally present in an amount of up to about 20 weight percent. Optional additional ingredients such as carbon black or graphite, blowing agents, expandable polymeric microspheres or beads, such as polypropylene or polyethylene microspheres, surfactants and corrosion inhibitors like barium sulfonate are generally present in an amount of less than about 5 weight percent of the total weight of the composition.

The viscosities of these coating products are application-specific based on type of equipment used, required film thickness and sag resistance. Preferably, the viscosity of the coating compositions greater than 1000, preferably ranges from about 1000 to about 1,000,000 centipoise ("cp") measured at 2 RPM with a #7 spindle Brookfield measurement. Sprayable compositions preferably have viscosities below about 100,000 cp at 20 RPM reading on the Brookfield viscometer at ambient temperature (about 25° C.).

The coating composition can be prepared by mixing the polymeric microparticle dispersion with the other components of the coating composition in a high energy vacuum mixer such as Dual Disperser Model HHL-2-1000 commercially available from Hockmeyer.

The compositions can be applied to the surface of a substrate in a number of ways, including spraying, extrusion, or by hand with a blade. Useful substrates include those formed from metal, polymers, such as thermoset materials and thermoplastic materials, and combinations of metal and polymeric substrates. Suitable metal substrates that can be coated according to the present invention include ferrous metals such as iron, steel, and alloys thereof, non-ferrous metals such as aluminum, zinc, magnesium and alloys thereof, and combinations thereof. Preferably, the substrate is formed from cold rolled steel, electrogalvanized steel such as hot dip electrogalvanized steel or electrogalvanized iron-zinc steel, aluminum or magnesium. The metal substrate to be treated can be bare, pretreated or prepainted (for example by electrocoating) prior to application of the coating.

Useful thermoset materials include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, EPDM rubber, copolymers and mixtures thereof.

The coatings of the present invention, when applied to a substrate, can provide fast-drying, mudcrack resistant coatings which can inhibit sound and or vibration transmission through the substrate.

The present invention will now be illustrated by the following specific, non-limiting example.

EXAMPLE

The polymeric materials were prepared in a four neck round bottom flask equipped with a thermometer, mechanical stirrer, condenser, nitrogen sparge and a heating mantle. The ingredients used to prepare each of Samples 1–5 and Comparative Sample 1 are shown in Table 1.

Water and a small portion of the methyl methacrylate and butyl acrylate were charged to the reactor with a small amount of ALIPAL surfactant and ammonium persulfate free radical initiator to form a seed. A preemulsion of the remaining monomers, surfactant and water were fed along with the initiator over a prescribed period of time (3 hours) at a reaction temperature of 80–85° C. using a nitrogen blanket. After a one hour hold, upon completion of the monomer feed, a post redox feed to reduce residual free monomer (including hydrogen peroxide/isoascorbic acid) was added to the reactor. The latex was neutralized to a pH of about 8 with dimethylamino ethanol. The final pH of each of the latices was about 7.5–8.5, the nonvolatile content was 39–40%, the Brookfield viscosity was 100–200 cps (spindle #1, 50 rpm), and the particle size was 1000–2000 angstroms.

TABLE 1

| Component | Sample 1 | Comp. Sample 1 | Sample 2 | Sample 3 | Sample 4 | Sample 5 |
|---|---|---|---|---|---|---|
| Monomer | Weight of Component (grams) | | | | | |
| Components | | | | | | |
| Methyl methacrylate | 26.4 | 162.62 | 66.1 | 212.74 | 26.4 | 13.2 |
| Butyl acrylate | 785 | 392.56 | 1506.7 | 301.35 | 754.6 | 377.3 |
| Acrylonitrile | 298.8 | 0 | 997.6 | 0 | 399 | 199.5 |
| Hydroxyethyl methacrylate | 0 | 0 | 350.3 | 70.05 | 0 | 0 |
| Methoxy polyethylene glycol methacrylate[1] | 70.2 | 35.08 | 0 | 0 | 0 | 0 |
| Ethylhexyl acrylate | 0 | 0 | 30 | 6 | 0 | 0 |
| Methacrylic Acid | 15 | 7.5 | 37.5 | 7.5 | 15 | 7.5 |
| Total Monomer Amount | 1195.4 | 597.76 | 2988.2 | 597.64 | 1195 | 597.5 |
| Other Components | | | | | | |
| ALIPAL CO436[2] | 21.4 | 10.71 | 53.6 | 10.71 | 21.4 | 10.7 |
| Ammonium Persulfate | 4.3 | 2.15 | 10.8 | 2.15 | 4.3 | 2.1 |
| Hydrogen Peroxide 50% in water | 4.8 | 2.39 | 12 | 2.39 | 4.8 | 2.4 |
| Isoascorbic Acid | 2.4 | 1.2 | 6 | 1.2 | 2.4 | 1.2 |
| Volatiles | | | | | | |
| Dimethyl amino ethanol | 13.1 | 6.57 | 32.9 | 6.57 | 13.1 | 6.6 |
| Deionized Water | 1768.2 | 884.1 | 4420.5 | 884.1 | 1768.2 | 884.1 |

About 200 g of coating was prepared from each polymeric dispersion of Samples 1–5 and Comp. Sample 1 formed above. Each dispersion was mixed at low agitation in a pint-sized container using an air driven motor for about 1 minute. FOAMMASTER 111 hydrocarbon defoamer (commercially available from Cognis) was added to the dispersion and mixed for about 1 minute, followed by slow addition of DOLOCRON 4512 magnesium calcium carbonate (commercially available from Specialty Minerals) and mixed for about 5 minutes. The mixing speed was increased as components were added to maintain a vortex throughout the procedure. RM-8 water soluble polyurethane thickener (commercially available from Rohm and Haas) was added to the mixture and mixed for 7–10 minutes. Each sample was placed in a vacuum chamber equipped with an agitator and a vacuum at least 700 mm Hg was applied with the agitator turning the material. The sample was removed when foaming subsided (about 3–5 minutes).

Draw downs of 3–4 inches long samples using a 2-inch wide 100-mil thick coating template were prepared on test panels coated with ED-6100 electrocoat which is commercially available from PPG Industries, Inc. of Pittsburgh, Pa. Each draw down was air dried at ambient temperature (about 25° C.), one set at 30% relative humidity and the other set at 60% relative humidity.

The degree of dryness was measured in the center area using a Shore "00" hardness gauge according to ASTM D 2240-97. Higher Shore hardness values indicate drier or stiffer coatings.

Mudcracking was evaluated on a separate set panels. The mudcracking determination was a visual determination based upon number, width and length of cracks. The coating on each panel was dried for two hours at ambient temperature (about 25° C.) at the indicated relative humidity and then for 22 additional hours at ambient temperature and relative humidity (about 50%).

The sound damping of each coating was measured using the Oberst ASTM Test Method E756-93 ("Standard Test Method for Measuring Vibration-Damping Damping Properties of Materials"), Sections 3 and 10, which are hereby incorporated by reference. The principle measure of sound deadening in this test is loss factor, represented by the Greek letter, eta [η], the ratio of loss modulus to storage modulus of the material. Oberst values typically range from 0.001 for uncoated steel (thickness 30 mils) (if the steel panel is struck, one would hear a "clang") to 0.01 ("bong") to 0.1 ("bunk") to 0.5 ("thud") for increasingly efficient coatings. The Oberst test measures the sound loss factor of the coating-substrate composite.

Each test sample was applied to an Oberst Bar, which is a metal bar formed from special oil-hardening ground flat stock, AISI/SAE GRD 0-1, 1/32 inch (0.8 mm) thick, ½ inch (12.7 mm) wide from McMaster-Carr, part number 89705-K121, and dried for 6 days in ambient air (about 25° C.). The thickness of each cured coating was 0.070. +/−0.01 inches (1.8 mm). The Oberst loss factor values were normalized to 0.070 inches thickness for comparison. Composite loss factors were compared at 200, 400, 600 and 800 Hz.

TABLE 2

Air Dry Sound Deadener Examples:

| Components | EX-1 | EX-2 | EX-3 | EX-4 | EX-5 | EX-6 |
|---|---|---|---|---|---|---|
| Sample 1 | 62.7 | — | — | — | — | 42.7 |
| Comparative | — | 62.7 | — | — | — | — |

TABLE 2-continued

Air Dry Sound Deadener Examples:

| Components | EX-1 | EX-2 | EX-3 | EX-4 | EX-5 | EX-6 |
|---|---|---|---|---|---|---|
| Sample 1 | | | | | | |
| Sample 2 | — | — | 62.7 | — | — | 10 |
| Sample 3 | — | — | — | 62.7 | — | — |
| Acronal DS 3502[3] | — | — | — | — | 62.7 | 10 |
| Foammaster 111[4] | 0.1 | 0.1 | 0.1 | 0.1 | 0.1 | 0.1 |
| Dolocron 4512[5] | 140 | 140 | 140 | 140 | 140 | 140 |
| Acrysol RM-8[6] | 0.2 | 0.2 | 0.2 | 0.2 | 0.2 | 0.2 |
| Total | 203 | 203 | 203 | 203 | 203 | 203 |
| Acrylic | 2.2 | 27.2 | 2.2 | 35.6 | | |
| Composition: | | | | | | |
| MMA | | | | | | |
| BA | 65.7 | 65.7 | 50.4 | 50.4 | | |
| ACN | 25.0 | — | 33.4 | — | | |
| [45% in water] | | | | | | |
| HEMA | — | — | 11.7 | 11.7 | | |
| M-PEG | 5.9 | 5.9 | — | — | | |
| EHA | — | — | 1.0 | 1.0 | | |
| MAA | 1.3 | 1.3 | 1.3 | 1.3 | | |
| Total | 100.0 | 100.0 | 100.0 | 100.0 | | |
| Degree of Drying . . . Shore 00* . . . | | | | | | |
| 30% Rel. Humidity, 2 hrs. | 79–84 | 38–44 | 89–95 | 65–71 | 60–64 | 81–87 |
| 60% relative humidity, 2 hrs. | 55–60 | 15–20 | 70–75 | 50–65 | 55–60 | 75–80 |
| Mudcracking. | | | | | | |
| 30% Rel. Humidity | slight | sl-mod | severe | Mod-severe | moderate | slight |
| 60% Relative Humidity | slight | sl-mod | severe | Mod-severe | moderate | slight |
| Oberst Loss Factor, 6 days air dry - normalized for .07" thickness | | | | | | |
| @ +25 C. | | | | | | |
| 200 Hz | 0.204 | 0.030 | 0.030 | 0.127 | 0.231 | 0.146 |
| 400 Hz | 0.425 | 0.051 | 0.030 | 0.126 | 0.533 | 0.147 |
| 600 Hz | 0.646 | 0.072 | 0.035 | 0.125 | 0.835 | 0.147 |
| 800 Hz | 0.867 | 0.092 | 0.039 | 0.124 | 1.137 | 0.148 |
| @ 55 C. | | | | | | |
| 200 Hz | 0.026 | 0.002 | 0.143 | 0.090 | 0.022 | 0.063 |
| 400 Hz | 0.043 | 0.006 | 0.224 | 0.157 | 0.022 | 0.107 |
| 600 Hz | 0.060 | 0.011 | 0.306 | 0.223 | 0.022 | 0.151 |
| 800 Hz | 0.077 | 0.016 | 0.388 | 0.289 | 0.023 | 0.194 |

[3]ACRONAL DS 3502 aqueous dispersion of an acrylic copolymer 55% solids commercially available from BASF Corp.
[4]FOAMMASTER 111 hydrocarbon defoamer commercially available from Cognis Canada
[5]DOLOCRON 4512, dolomite calcium magnesium carbonate commercially available from Specialty Minerals.
[6]ACRYSOL RM-8 rheology modifier water soluble polyurethane commercially available from Rohm & Haas.

As shown in Table 2, coating compositions prepared according to the present invention can provide acceptable drying times, mudcracking resistance and sound deadening properties.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A coating composition for sound and vibration dampening comprising:
   (a) an aqueous dispersion of polymeric microparticles prepared from components comprising:
      (i) a nitrile functional material; and
      (ii) a polyoxyalkylene acrylate; and
   (b) a filler material comprising about 20 to about 90 weight percent of the coating composition on a basis of total weight of the coating composition.

2. The coating composition according to claim 1, wherein the nitrile functional material is selected from the group consisting of acrylonitrile, methacrylonitrile, esters, copolymers and mixtures thereof.

3. The coating composition according to claim 1, wherein the nitrile functional material comprises about 1 to about 99 weight percent of the components used to prepare the polymeric microparticles.

4. The coating composition according to claim 1, wherein the polyoxyalkylene acrylate is selected from the group consisting of alkoxy polyoxyethylene acrylates, alkoxy polyoxyethylene methacrylates, alkoxy polyoxypropylene acrylates, alkoxy polyoxypropylene methacrylates, alkoxy polyoxyethyleneoxypropylene acrylates, alkoxy polyoxyethyleneoxypropylene methacrylates, alkoxy polyoxybutylene acrylates, alkoxy polyoxybutylene methacrylates, copolymers and mixtures thereof.

5. The coating composition according to claim 1, wherein the polyoxyalkylene acrylate has a terminal alkoxy group.

6. The coating composition according to claim 1, wherein the polyoxyalkylene acrylate comprises about 1 to about 99 percent by weight of the components used to prepare the polymeric microparticles.

7. The coating composition according to claim 1, wherein the polymeric microparticles comprise the reaction product of components comprising: (i) the nitrile functional material; and (ii) the polyoxyalkylene acrylate.

8. The coating composition according to claim 1, wherein the polymeric microparticles comprise a blend of components comprising: (i) the nitrile functional material; and (ii) the polyoxyalkylene acrylate.

9. The coating composition according to claim 1, wherein the components from which the polymeric microparticles are prepared further comprise an ethylenically unsaturated monomer or ester thereof.

10. The coating composition according to claim 9, wherein the ethylenically unsaturated monomer or ester thereof comprises a hydroxy functional group.

11. The coating composition according to claim 9, wherein the ethylenically unsaturated monomer comprises about 1 to about 85 percent by weight of the components used to produce the polymeric microparticles.

12. The coating composition according to claim 1, wherein the filler material comprises about 20 to about 90 weight percent of the coating composition on a basis of total weight of the coating composition.

13. The coating composition according to claim 1, wherein the coating composition further comprises a polymeric film-forming material different from the polymeric microparticles.

14. The coating composition according to claim 13, wherein the polymeric film-forming material is selected from the group consisting of polyepoxides, polyurethanes, polyamides, polyesters, polyacrylates, polyvinyl chlorides, and mixtures and copolymers thereof.

15. A coating composition for sound and vibration dampening comprising:
(a) an aqueous dispersion of polymeric microparticles prepared from components comprising:
(i) an amide functional materials; and
(ii) a polyoxyalkylene acrylate; and
(b) a filler material comprising about 20 to about 90 weight percent of the coating composition on a basis of total weight of the coating composition.

16. The coating composition according to claim 15, wherein the amide functional material is selected from the group consisting of polyacrylamides, polymethacrylamides, copolymers and mixtures thereof.

17. A coating composition for sound and vibration dampening comprising:
(a) an aqueous dispersion of polymeric microparticles prepared from components comprising:
(i) a carbamate functional materials; and
(ii) a polyoxyalkylene acrylate; and
(b) a filler material comprising about 20 to about 90 weight percent of the coating composition on a basis of total weight of the coating composition.

18. A coating composition for sound and vibration dampening comprising:
(a) a first aqueous dispersion of polymeric microparticles having a glass transition temperature greater than 5° C. and being prepared from a first nitrile functional material;
(b) a second aqueous dispersion of polymeric microparticles having a glass transition temperature greater than 5° C. and being prepared from a second nitrile functional material, the polymeric microparticles of the first aqueous dispersion being different from the polymeric microparticles of the second aqueous dispersion; and
(c) a filler material comprising about 20 to about 90 weight percent of the coating composition on a basis of total weight of the coating composition.

19. The coating composition according to claim 18, wherein the polymeric microparticles of the first aqueous dispersion are further prepared from a polyoxyalkylene acrylate.

20. The coating composition according to claim 18, wherein the polymeric microparticles of the second aqueous dispersion are further prepared from a hydroxy functional material.

21. A coating composition for sound and vibration dampening comprising:
(a) a first aqueous dispersion of polymeric microparticles having a glass transition temperature greater than 5° C. and being prepared from a nitrile functional material;
(b) a second aqueous dispersion of polymeric microparticles having a glass transition temperature greater than 5° C. and being prepared from a hydroxy functional material; and
(c) a filler material comprising about 20 to about 90 weight percent of the coating composition on a basis of total weight of the coating composition.

22. A coating composition for sound and vibration dampening comprising:
(a) an aqueous dispersion of polymeric microparticles having a glass transition temperature greater than 5° C. and being prepared from components comprising:
(i) a nitrile functional material; and
(ii) a hydroxy functional material; and
(b) a filler material comprising about 20 to about 90 weight percent of the coating composition on a basis of total weight of the coating composition.

23. A coating composition for sound and vibration dampening comprising:
(a) an aqueous dispersion of polymeric acrylic microparticles having a glass transition temperature greater than +10° C. and being prepared from components comprising:
(i) a hydroxy functional material;
(ii) an acid functional material; and
(iii) an acrylate monomer different from (i); and
(b) a filler material comprising about 20 to about 90 weight percent of the coating composition on a basis of total weight of the coating composition.

24. A coated substrate having an at least partially dried residue of the coating composition of claim 1 deposited on a surface thereof.

25. A coated substrate having an at least partially dried residue of the coating composition of claim 15 deposited on a surface thereof.

26. A coated substrate having an at least partially dried residue of the coating composition of claim 17 deposited on a surface thereof.

27. A coated substrate having an at least partially dried residue of the coating composition of claim 18 deposited on a surface thereof.

28. A coated substrate having an at least partially dried residue of the coating composition of claim 21 deposited on a surface thereof.

29. A coated substrate having an at least partially dried residue of the coating composition of claim 22 deposited on a surface thereof.

30. A coated substrate having an at least partially dried residue of the coating composition of claim 23 deposited on a surface thereof.

31. A method for inhibiting sound transmission through a substrate, comprising:

(a) applying to the substrate the coating composition of claim 1; and (b) at least partially drying the coating composition to provide a coating upon the substrate for inhibiting sound transmission therethrough.

32. A method for inhibiting sound transmission through a substrate, comprising:

(a) applying to the substrate the coating composition of claim 15; and (b) at least partially drying the coating composition to provide a coating upon the substrate for inhibiting sound transmission therethrough.

33. A method for inhibiting sound transmission through a substrate, comprising:

(a) applying to the substrate the coating composition of claim 17; and (b) at least partially drying the coating composition to provide a coating upon the substrate for inhibiting sound transmission therethrough.

34. A method for inhibiting sound transmission through a substrate, comprising:

(a) applying to the substrate the coating composition of claim 18; and (b) at least partially drying the coating composition to provide a coating upon the substrate for inhibiting sound transmission therethrough.

35. A method for inhibiting sound transmission through a substrate, comprising:

(a) applying to the substrate the coating composition of claim 21; and (b) at least partially drying the coating composition to provide a coating upon the substrate for inhibiting sound transmission therethrough.

36. A method for inhibiting sound transmission through a substrate, comprising:

(a) applying to the substrate the coating composition of claim 22; and (b) at least partially drying the coating composition to provide a coating upon the substrate for inhibiting sound transmission therethrough.

37. A method for inhibiting sound transmission through a substrate, comprising:

(a) applying to the substrate the coating composition of claim 23; and (b) at least partially drying the coating composition to provide a coating upon the substrate for inhibiting sound transmission therethrough.

* * * * *